United States Patent

Moshier et al.

[11] Patent Number: 5,243,899
[45] Date of Patent: Sep. 14, 1993

[54] APPARATUS FOR MAKING A PIZZA TOPPING DISK

[75] Inventors: Mark W. Moshier, Stony Brook; Larry R. Behm, Wichita; Susan Jaax, Garden Plain, all of Kans.

[73] Assignee: Pizza Hut, Inc., Wichita, Kans.

[21] Appl. No.: 746,657

[22] Filed: Aug. 16, 1991

[51] Int. Cl.5 ............... A23P 1/00; A21C 9/04; A21C 9/08; A21D 13/00
[52] U.S. Cl. .................... 99/450.1; 99/443 C; 99/447; 99/483; 99/484
[58] Field of Search .......... 99/450.1, 450.2, 450.6, 99/450.7, 357, 326, 334, 352, 353, 355, 426, 427, 484, 443 C, 447, 483; 118/16, 24; 221/150 A, 150 HC; 219/388; 426/523

[56] References Cited

U.S. PATENT DOCUMENTS

| | | | |
|---|---|---|---|
| 3,221,672 | 12/1965 | Falco | 99/450.1 |
| 3,358,618 | 12/1967 | Vetta | 99/450.1 |
| 3,648,596 | 3/1972 | Zito . | |
| 3,725,974 | 4/1973 | Kuhlman | 99/450.7 |
| 3,735,692 | 5/1973 | Marchignoni . | |
| 3,760,715 | 9/1973 | Grote et al. | 99/494 |
| 3,892,171 | 7/1975 | Fitch et al. | 99/450.7 |
| 4,066,796 | 1/1978 | McKee | 426/302 |
| 4,112,834 | 9/1978 | Thiry | 99/494 |
| 4,152,976 | 5/1979 | Kawasaki et al. | 99/494 |
| 4,159,349 | 6/1979 | Caiello | 426/94 |
| 4,197,794 | 4/1980 | Raque et al. | 118/16 |
| 4,276,465 | 6/1981 | Flavio | 219/388 |
| 4,283,431 | 8/1981 | Giordano et al. | 426/296 |
| 4,367,243 | 1/1983 | Brummett et al. | 426/303 |
| 4,753,815 | 6/1988 | Kielsmeier et al. . | |
| 4,997,670 | 3/1991 | Kielsmeier et al. | 426/582 |
| 5,023,096 | 6/1991 | Plochman | 426/89 |
| 5,117,749 | 6/1992 | Bakker | 99/450.1 |
| 5,121,677 | 6/1992 | LeClaire et al. | 99/357 |

FOREIGN PATENT DOCUMENTS

| | | |
|---|---|---|
| 0168118 | 1/1986 | European Pat. Off. . |
| 2639193 | 5/1990 | France . |
| 0765996 | 9/1971 | Italy ............ 99/450.7 |
| 61-21067 | 1/1986 | Japan . |
| 61-5383 | 2/1986 | Japan . |
| 62-232333 | 10/1987 | Japan . |
| 63-267242 | 11/1988 | Japan . |
| 1-108959 | 4/1989 | Japan . |
| 57-12963 | 1/1992 | Japan . |
| 2000010A | 1/1979 | United Kingdom . |
| 2223391 | 4/1990 | United Kingdom . |

Primary Examiner—Timothy F. Simone
Attorney, Agent, or Firm—Willian Brinks Olds Hofer Gilson & Lione

[57] ABSTRACT

An apparatus for making a pizza toppings disk is disclosed. An apparatus, made in accordance with the present invention includes a conveyor means for transporting forming surfaces, and a plurality of depositing means for depositing onto forming surfaces a quantity of cheese and a plurality of pizza toppings that may include but are not limited to the following items: sliced meats, ground meats, or vegetables, as well as combinations thereof. A fusing means is also included which fuses the quantity of cheese and plurality of pizza toppings to form a pizza toppings disk that may be frozen for storage and subsequent use in assembling a pizza.

17 Claims, 4 Drawing Sheets

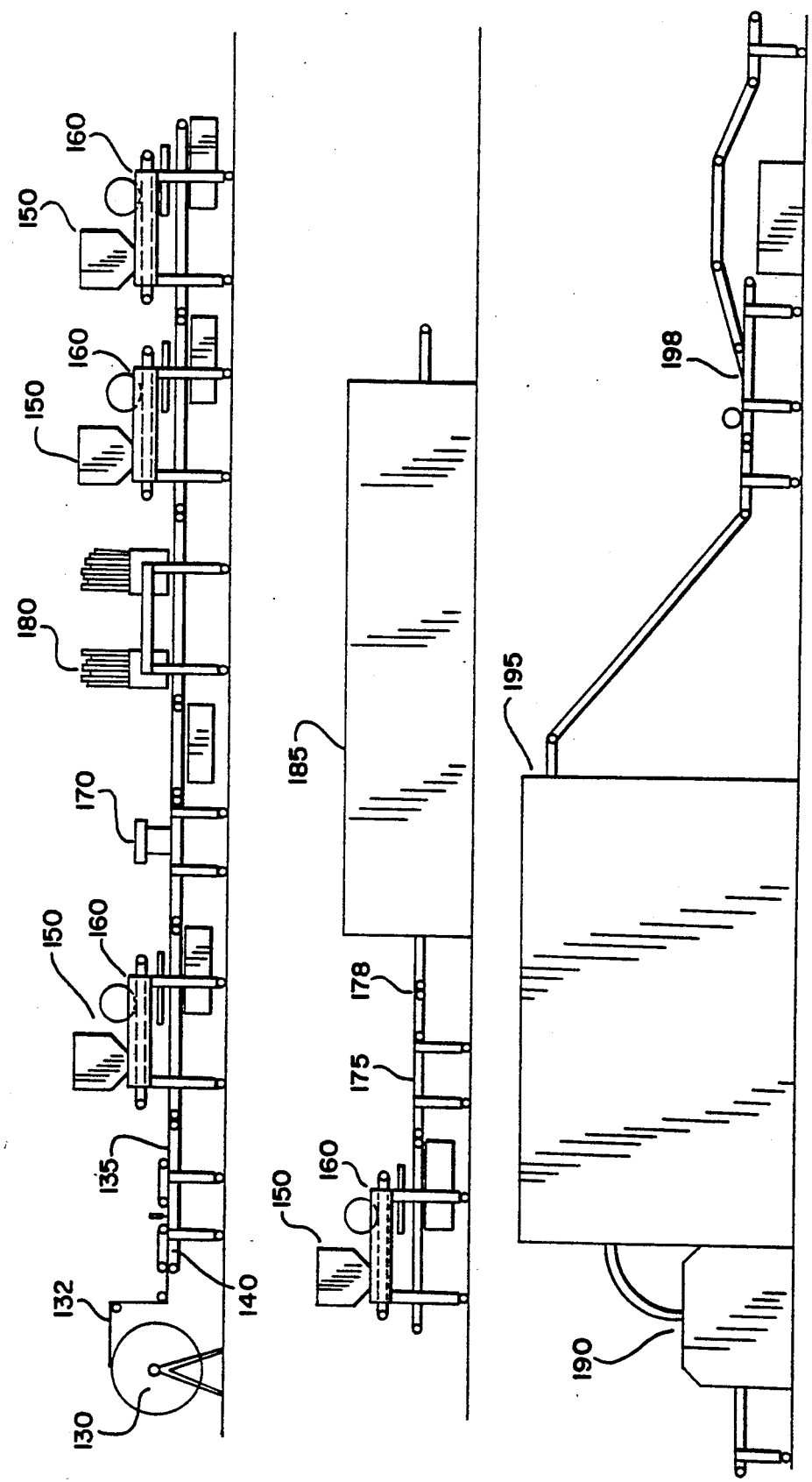

APPARATUS FOR MAKING A PIZZA TOPPING DISK

BACKGROUND OF THE INVENTION

The present invention relates to the field of pizzas and pizza toppings. More particularly, the invention relates to methods and apparatus for assembling pizza ingredients to form pizzas.

The preparation and cooking of pizzas in the food industry requires numerous labor intensive steps. For example, pizza dough is prepared and formed into a shell. Also, the cheese and pizza toppings are applied to the shell one at a time. In addition, in a pizza restaurant delivery and/or carryout business each ingredient that is added as a topping is typically measured or weighed to insure uniformity of the finished product. Naturally, these several steps add to the cost and the time it takes to prepare the products.

Assuring uniformity of pizzas made by different employees can also be a challenge for the pizza restaurant, delivery, and/or carryout business. In addition, lack of uniformity affects cost control. Even small additional amounts of ingredients over the specified quantity add up over time to large additional expenses for a pizza restaurant delivery, and/or carryout business.

Products and methods have been developed attempting to reduce the cost and increase the speed and uniformity of preparing pizzas.

For instance, U.S. Pat. No. 4,159,349 to Caiello discloses a pizza and method that includes using up to four geometrically congruent slices of pizza cheese having apertures. The slices are arranged to form one layer to cover the pizza shell.

U.S. Pat. No. 4,066,769 to McKee discloses a pizza coating product containing a water-soluble algin, preferably for use with a frozen pizza. The water-soluble algin is applied to the surface of the pizza dough that forms the pizza crust prior to the addition of any toppings or tomato sauce.

U.S. Pat. No. 4,753,815 to Kielsmeier, et al., discloses a method of preparing and quick freezing cheese in granular form to maintain granule moisture. The cheese granules are then baked on the pizza in a frozen or partially frozen condition.

U.S. Pat. No. 4,283,431 to Giordano, et al., discloses a method of making a double-layered pizza product. The method disclosed uses two layers of pastry dough with traditional pizza toppings placed in between the pastry layers before baking the pizza.

SUMMARY OF THE INVENTION

Briefly stated, the present invention provides an apparatus for making a pizza toppings disk.

In one aspect, the present invention is an apparatus for depositing onto forming surfaces a quantity of cheese and a plurality of pizza toppings that may include but are not limited to the following items: sliced meats, ground meats, or vegetables, as well as combinations thereof. The quantity of cheese and the plurality of pizza toppings are deposited onto a conveyor having a forming surface. A fusing means fuses the quantity of cheese and plurality of pizza toppings to form a pizza toppings disk that is stored for subsequent use in assembling a pizza.

In a preferred embodiment of the present invention, a conveyor means transports a plurality of forming surfaces under a plurality of depositing means. The depositing means deposit cheeses and selected amounts of typically requested pizza toppings onto the forming surfaces. As the components of cheese and typically requested pizza toppings are deposited onto the forming surfaces from the depositing means they cascade through a template conveyor means. The template conveyor means is configured such that as the components fall onto the forming surfaces a specific pattern is formed. The components are then fused together to form a pizza toppings disk that is frozen for storage and subsequent use in assembling a pizza.

In another preferred embodiment of the present invention a quantity of cheese is deposited onto a forming surface to form a layer of cheese. Deposited on top of this layer of cheese are selected amounts of typically requested pizza toppings. The layer of cheese and the selected pizza toppings fall through a template conveyor means and form a specific pattern on the forming surfaces as they are deposited. The components are then fused together to form a pizza toppings disk that is frozen for storage and subsequent use in assembling a pizza.

In a more preferred embodiment of the present invention, a second quantity of cheese is deposited on top of a first layer of cheese and selected pizza toppings to form a second layer of cheese. The layers of cheese and the pizza toppings are deposited from a depositing means through a template conveyor means such that a specific pattern is formed as they are deposited on the forming surfaces. The components are then fused together to form a pizza toppings disk. The toppings disk is frozen for storage and subsequent use.

In another preferred embodiment of the present invention a sliced meat depositing means deposits on the forming surfaces a quantity of sliced meats. The sliced meats deposited are deposited in a predetermined pattern on the forming surfaces.

In making a pizza in accordance with the present invention a pizza shell is provided. An uncooked pizza is formed by assembling the toppings disk and the pizza shell. The toppings disk and pizza shell are then baked to provide a pizza.

The present invention offers several advantages for a pizza restaurant, delivery and/or carryout business. Some advantages include greater cost control, increased labor savings, convenience, better uniformity of pizzas made by different employees, and closer control over the final product because a pizza toppings disk can be made prior to when a pizza is ordered. Pizza toppings disks can be made at a centralized location. Preparing the toppings disks at a centralized location can reduce the preparation space necessary to make an assembled pizza on site at pizza restaurants, deliveries and/or carry out businesses.

Additionally, the present invention can reduce the amount of time required to prepare a pizza. When an order for a pizza is received the pizza can be assembled more quickly by using a pizza toppings disk that has been prepared in advance, than by using the present traditional methods of making a pizza.

The present invention, together with its attendant objects and advantages, will be best understood with reference to the detailed description below read in conjunction with the accompanying drawings.

BRIEF DESCRIPTION OF THE DRAWINGS

FIG. 2 is a perspective view of a preferred apparatus for making a pizza toppings disk.

DETAILED DESCRIPTION OF THE PREFERRED EMBODIMENTS

In accordance with the present invention, an apparatus for making a pizza toppings disk includes generally a conveyor means, at least one forming surface, at least one depositing means, a fusing means, and a freezing means, wherein the components of the pizza toppings disk are deposited from at least one depositing means onto a forming surface as the forming surface travels along a conveyor or automated traveling means to a fusing means, where the components are then fused together to form a pizza toppings disk that is stored for subsequent use in assembling a pizza.

Figure 1:
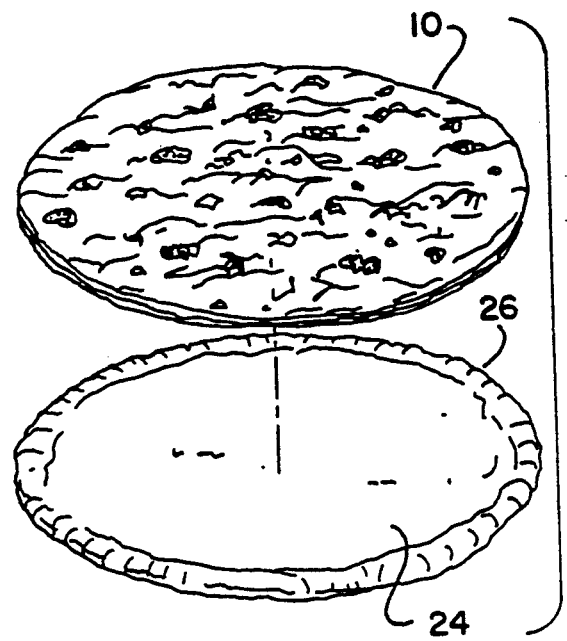
FIG. 1 is a perspective view illustrating a preferred use for a pizza toppings disk of the present invention.

Typically, a pizza toppings disk 10 of FIG. 1 is used in assembling a pizza. Optionally, a pizza toppings disk of the present invention may be placed onto the uncooked shell of any size or type of pizza. Examples of such shells may include but are not limited to pizza shells for a hand-tossed traditional crust, a pan-style pizza, a thin-crust style pizza, or a double-crust style pizza. These styles of pizzas are well known in the art. In accordance with the present invention an uncooked shell is intended to include "par baked" shells which are shells that are partially baked, completely unbaked shells, or any shell that is frozen. Optionally, a fully baked shell or fully baked shell frozen in advance, may be used in assembling a pizza.

Figure 1A:
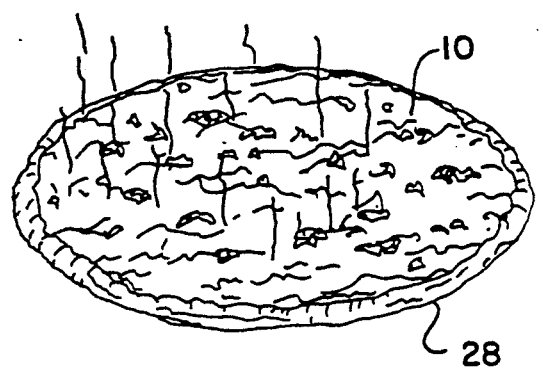
FIG. 1a is a perspective view of a cooked pizza made in accordance with the present invention.

As illustrated in FIG. 1, a toppings disk 10, made in accordance with present invention, is removed from storage and is placed on top of an uncooked pizza shell 20. The pizza toppings disk and uncooked pizza shell are then baked to produce a cooked pizza 25, as illustrated in FIG. 1a. Baking may include the use of a microwave to produce the cooked pizza 25. Preferably tomato sauce or traditional pizza sauce is applied between the toppings disk and the pizza shell.

Automating the process of making a pizza toppings disk reduces labor and overhead expenses and results in cost control savings. In a preferred embodiment of the present invention, the apparatus for automating the process of making a pizza toppings disk includes a conveyor means which transport forming surfaces, a depositing means from which cheese and selected pizza toppings are deposited automatically onto the forming surfaces as they travel on the conveyor means, a fusing means which fuses the components to form a toppings disk, an a freezing means for freezing the toppings disk for storage and subsequent use in assembling a pizza.

In a preferred embodiment, the apparatus for making a pizza toppings disk includes a conveyor which continuously transports a forming surface. At predetermined intervals a depositing means deposits a quantity of cheese onto the forming surface to form a first layer of cheese. The forming surface continues along the conveyor or other automated traveling surface to a second depositing means where selected amounts of typically requested pizza toppings are deposited onto the layer of cheese and the forming surface. The forming surface with the first layer of cheese and the layer of selected pizza toppings continues along the conveyor to a fusing means where the quantity of cheese and selected pizza toppings are fused together to form a pizza toppings disk. A freezing means freezes the fused pizza toppings disk which then may be stored for subsequent use in assembling a pizza.

In another preferred embodiment, a forming surface is placed on a conveyor means or other automated traveling means. Preferably, the forming surface has the profile shape and diameter of the desired finished toppings disk. Generally, the forming surface placed on the conveyor can be any flat surface, such as the following surfaces: pans, paper, ring, mold, plastics, metallic materials or similar items. Optionally, the conveyor belt may be used as the forming surface. Preferably, the forming surface is made of parchment paper having a high tensile strength and a flash point that is greater than 500° F. More preferably, the forming surface is coated with a mixture of vegetable oil and silicon. The mixture aids in better separation of the forming surfaces from various finished pizza toppings disk combinations. Optionally, other materials having a slick surface may be used as forming surfaces. The forming surfaces may be delivered to the conveyor means or other automated means by a standard paper carrier such as the type manufactured by The James River Co. of Virginia. The forming surfaces are arranged on the conveyor means in a single file with a predetermined spacing between surfaces.

In a preferred embodiment, the forming surfaces are transported by a conveyor or other automated traveling means under a depositing means where a quantity of cheese or a selected quantity of a typically requested pizza topping is deposited onto the forming surface in a shape substantially similar to that of the forming surface. Preferably, the component is deposited onto the forming surface in a manner wherein the component falls onto the forming surface and forms a specific shape on the forming surface. More preferably, a quantity of cheese is used as the first component to be deposited onto the forming surface and forms a first layer of cheese on the forming surface when deposited.

In general, any type of cheese appropriate for a pizza is used to make a pizza toppings disk of the present invention. Preferably cheeses which melt evenly and do not separate upon heating are used to form a toppings disk. More preferably low moisture part-skim mozzarella cheese is used.

The cheeses used to make a pizza toppings disk of the present invention are preferably in the form of shredded or sliced cheeses. Shredded cheeses used may be of a powder consistency. Spices may be added to the cheeses used to form a pizza toppings disk. Such spices may include but are not limited to the following: oregano, italian seasoning, garlic, basil, salt or pepper, as well as combinations thereof.

The amounts of the total specified quantity of cheeses to be used and the amounts of the selected pizza toppings to be applied vary according to the size and type of pizza toppings disk desired. Typically, the total quantity of cheese used amounts to between approximately 30% and 90% of the total weight of a pizza toppings disk. Optionally, the total quantity of cheese used may amount to approximately 100% of the total weight of a pizza toppings disk if a "cheese only" toppings disk is desired.

In accordance with the present invention, upon depositing the first component onto the forming surface, the forming surface is transported through a plurality of depositing means wherein a quantity of cheese or other edible binding agent and typically requested pizza toppings are deposited onto the first component. The pizza toppings which are deposited may include, but are not limited to, the following items: sliced meats, ground meats, or vegetables as well as combinations thereof.

The pizza toppings of the present invention may include but are not limited to selections from the following group of items: sliced meats, ground meats, or vegetables, as well as combinations thereof. Optionally the selected toppings may be pre-cooked prior to forming a toppings disk. Preferably, the amounts of a selected pizza topping are premeasured for the desired disk size and evenly distributed over the surface area of the pizza toppings disk. Amounts of the pizza toppings combined with the total specified quantity of cheese may vary according to the size and type of pizza toppings disk desired. Optionally, the pizza toppings disk may be customized to certain topping types by combining an individual pizza topping or a combination of pizza toppings with the total specified quantity of cheese. Additionally, a combination of one or more toppings disks may be utilized for assembling a single pizza.

Preferably a quantity of cheese or other edible binding agent is deposited as the first component on the forming surface to form a first layer of cheese. Preferably, deposited on top of this first quantity of cheese are one or more typically requested pizza toppings, depending on the finished toppings disk desired. Upon depositing the selected pizza toppings, an additional amount of cheese or other binding agent is deposited onto the toppings.

In a more preferred embodiment of the present invention, a first quantity of cheese is deposited as a first layer of cheese on a forming surface. In accordance with this preferred embodiment between approximately 20% and approximately 80% of the total specified quantity of cheese of the toppings disk is deposited on the forming surface to form the first layer of cheese. Deposited on top of this layer of cheese are selected amounts of typically requested pizza toppings. A second quantity of cheese is evenly deposited over the first layer of cheese and the selected pizza toppings to form a second layer of cheese. Typically this second layer of cheese consists of between approximately 20% and approximately 80% of the total specified quantity of cheese for the toppings disk.

In another more preferred embodiment of the present invention, a first quantity of cheese is deposited as a first layer of cheese on a forming surface. Typically between approximately 35% and approximately 45% of the total specified quantity of cheese in this more preferred embodiment is deposited on the forming surface to form the first layer of cheese. Prior to the application of selected amounts of typically requested pizza toppings a portion of the total specified quantity of cheese is combined with these selected pizza toppings. The combination of cheese and selected pizza toppings is deposited onto the first layer of cheese. In this more preferred embodiment, between approximately 10% and approximately 20% of the total specified quantity of cheese is included in the combination of cheese and pizza toppings. In accordance with this more preferred embodiment, a second quantity of cheese is evenly dispensed over the first layer of cheese and the combination of cheese and selected toppings. The second quantity of cheese is dispensed to form a second layer of cheese. In this more preferred embodiment, the second layer of cheese consists of between approximately 35% and approximately 45% of the total specified quantity of cheese for a pizza toppings disk.

A preferred means for depositing the components of a toppings disk is a waterfall depositing means. A waterfall depositing means, made in accordance with the present invention incorporates a unique template conveyor means. The template conveyor means enables the components of the toppings disk to be deposited onto the forming surface in a specific shape while recycling excess amounts. The template conveyor means removes excess collected amounts of the binding agent to a reclaim feed system that resupplies the waterfall depositing means.

Preferably, the template conveyor means is configured and shaped to deposit the desired amount of a component onto the forming surface in a predetermined profile. Preferably, the template conveyor means is configured and shaped such that the component being deposited falls onto the forming surface and forms a specific shape on the forming surface which thereby avoids having to recycle excess amounts. Preferably, the template conveyor is configured such that a loop having a series of templates is formed which encompasses the automated traveling means upon which the forming surfaces are transported. Additionally, the template conveyor includes a drive means which synchronizes each individual template with a forming surface such that the template travels a predetermined distance above and is in synchronized correspondence with a forming surface.

Another preferred means for depositing the components of a toppings disk is a weighbelt depositing means. This preferred depositing means is also designed and configured to incorporate a template conveyor means which is substantially similar to the template conveyor means described above. The weighbelt depositing means and template conveyor means will be described in greater detail in connection with FIGS. 4 and 5.

Once all the components are deposited on the forming surface, they are transported along the conveyor or automated traveling means to a fusing means. The fusing means fuses the components together to thereby form a pizza toppings disk. The total quantity of cheese and selected pizza toppings may be fused together by one of the following methods: chemical, mechanical, or thermal methods. Examples of such methods include but are not limited to partially melting the cheese; applying a vacuum; applying a pressure such as a roller press; applying a food safe adhesive such as gums, pectines, gelatins, or an edible film; or applying a food safe shrink wrap or a spray wrap.

Preferably the total quantity of cheese and the selected pizza toppings are fused together by heating and an impingement of steam air. In accordance with such a method, the components are subjected to a partial, minimal melt. The temperature and amount of humidity necessary to accomplish this minimal melt may vary depending on the type of cheese used and the type of heating element employed. The amount of time required to achieve a partial minimal melt varies according to the following factors: the selected heating temperature, the percentage of humidity, the individual pizza toppings chosen, and the final size desired for the toppings disk.

Once fused together, the pizza toppings disk is transported to a freezing means where the temperature of the disk is cooled until frozen. Preferably the disk is frozen for use at a subsequent date in assembling a pizza. Optionally, the pizza toppings disk is stored under refrigeration without being frozen prior to being used in assembling a pizza.

Figure 3:
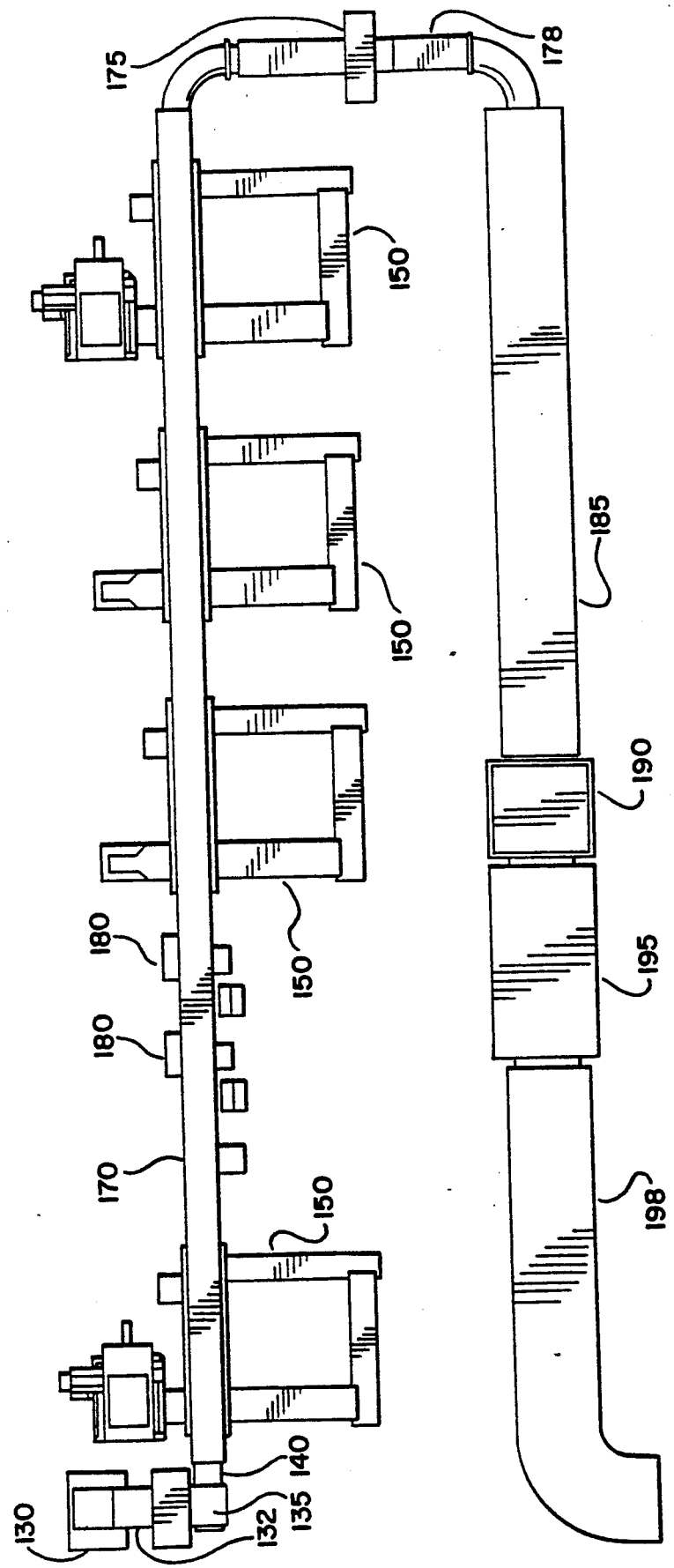
FIG. 3 is a top view of a preferred apparatus for making a pizza toppings disk.

Referring now to FIGS. 2 and 3, a more preferred embodiment 100 of the apparatus for making a pizza toppings disk is illustrated. In this preferred embodiment 100, the forming surfaces 135 are fed from a continuous unwind source 130 onto an automated conveyor belt 140. preferably, the forming surfaces are constructed from paper 132 having a high tensile strength and a flash point greater than approximately 300° F. More preferably, the forming surfaces 135 have a flash point greater than approximately 500° F. The paper 132 is guided in roll form from the unwind source 130 to the conveyor belt 140, which is traveling between approximately 45 feet per minute to 110 feet per minute. As the paper 132 is guided to the conveyor belt 140 it is sheared into individual segments or forming surfaces 135. Preferably, the forming surfaces 135 are coated with a mixture of vegetable oil and silicon. The coating aids in separating the various finished toppings disks from the forming surface. Preferably, the forming surfaces 135 are arranged in single file at predetermined space intervals on the conveyor belt 140. Optionally, plastic, metallic, and other materials may be used as forming surfaces in place of paper. In addition, the conveyor belt 140 may be configured to incorporate internal forming surfaces within the traveling means.

The forming surface 135 is transported along the conveyor means 140 to a depositing means 150. The depositing means 150 deposits layer of a selected component onto the forming surface 135 to form a base layer upon which additional components of the pizza toppings disk are deposited. Preferably, the depositing means 150 is configured to deposit the correct specification of shape, volume, and density of the pizza toppings disk component within a predetermined profile space in a continuous manner. Preferably, the depositing means is used in conjunction with a template conveyor means 160 which is synchronized to deposit the components of a pizza toppings disk onto the forming surfaces 135 in a predetermined profile shape. The depositing means 150 and template conveyor means 160 will be described in greater detail with respect to FIGS. 4 and 5.

In a preferred embodiment of the present invention, the base layer upon which the additional pizza toppings components are deposited is formed of cheese or another similar edible binding agent. Preferably, the cheese is deposited in a continuous flow onto the forming surface 135 to for a base layer. More preferably, pre-shredded frozen mozzarella or other typical pizza cheese is deposited.

Upon depositing a base layer of a selected component, the forming surface 135 is then transported along the conveyor 140 to a check weighing means 170. Preferably, the check weighing means 170 checks the amount of the first component deposited by the depositing means 150. The check weighing means 170 aids in regulating the performance of the depositing means 150. Additionally, the check weighing means 170 is capable of discharging and reclaiming amounts of the deposited component which are not within the specification desired for the finished pizza toppings disk. Preferably, the forming surfaces are presented to the check weighing means 170 in a single file manner. Preferably, the check weighing means 170 is a standard in line high speed check weighing system of the type manufactured by Hi-Check Weigher Company of Ithaca, New York.

From the check weighing means 170, the forming surface 135 and the first deposited component are transported to a depositing means designed to deposit sliced meats in a specific predetermined pattern. The sliced meats depositing means 180 deposits components of the pizza toppings disk such as pepperoni in a predetermined pattern that corresponds to the size and shape of the first component deposited on the forming surface 135. Preferably, forming surfaces are presented to the sliced meats depositing means 180 in a single file manner. Preferably, a standard pizza manufacturer slicer such as the Pepp-o-matic, manufactured by Grote, Inc. of Ohio is used to deposit the sliced meats.

Upon depositing the sliced meats on the forming surface 135 and the first deposited component, the forming surface is transported through a plurality of depositing means which are substantially similar to the depositing means 150 described previously. As the forming surface is guided through these depositing means, additional pizza toppings components are deposited. Preferably, typically requested pizza topping items such as vegetables and ground meats are deposited individually or in a combined mixture on top of the sliced meats.

As illustrated in FIGS. 2 and 3, the forming surface 135 is transported through a plurality of depositing means 150 after traveling through the sliced meats depositing means. In the preferred embodiment illustrated in FIGS. 2 and 3 separate depositing means 150 are arranged to deposit the remaining components of the pizza toppings disk onto the forming surface 135. Preferably the forming surface 135 is passed through a depositing means 150 for depositing vegetables and a depositing means 150 for depositing ground meats. Optionally, a single depositing means 150 may be used to deposit a preblended combination of ground meats and vegetables. Preferably, an additional depositing means 150 is used to deposit an additional layer of cheese or other binding agent. More preferably, the additional layer of cheese is deposited as the final pizza toppings disk component on the forming surface 135.

Optionally, upon deposit of the various components of the pizza toppings disk, the forming surface 135 containing these components is guided through an inline metal detector 175. The metal detector 175 indicates if an individual forming surface contains an excessive amount of metal. If this occurs the contaminated forming surface is disposed of before continuing along the conveyor belt means 140. Preferably, an inline standard metal detector of the type known in the art is used which is able to detect particle size greater than accepted safety standards for the various types of pizza toppings disks.

Preferably, as the forming surfaces 135 pass the metal detector 175 they are diverted from a single feed loading along the conveyor 140 to a triple feed loading before entering the fusing means 185. The triple feed loading provides a more efficient presentation of forming the surfaces as they enter the fusing means 185.

Preferably a standard lane diverter 178 of the type known in the art is used.

After being rearranged by the lane diverter 178 the forming surfaces 135 containing the assembled components of a pizza toppings disk enter a fusing means 185. The fusing means 185 fuses together the selected pizza toppings and cheeses to form a pizza toppings disk. Preferably, the components are fused together by being subjected to a partial minimal melt combined with an impingement of steam, preferably, the impingement of steam is enough that a nominal amount of free standing water remains on the surface of the toppings disk as the disk exits the fusing means. The free standing water prevents dehydration of the components of the toppings disk during chilling and freezing. More preferably the forming surfaces 135 and the assembled components are exposed to a temperature between approximately 100° F. and 450° F. with an impingement of steam having approximately 2% to 50% humidity for approximately 15 seconds to approximately 60 seconds. Most preferably, the forming surfaces 135 and assembled components are exposed to a temperature between approximately 200° F. and approximately 350° F. with an impingement of steam having approximately 4% to approximately 10% for approximately 25 seconds to approximately 40 seconds. In the preferred embodiment illustrated in FIGS. 2 and 3 the fusing means 185 is modular in design and has independent temperature, humidity, and air velocity controls. The modules of the fusing means are designed to meet the United States Department of Agriculture requirements. Preferably, the fusing means 185 may be one of several models of high velocity convection ovens such as those manufactured by Stein Inc., of Sandusky, Ohio.

Optionally, upon exiting the fusing means 185, the forming surfaces 135 and the fused toppings disks 110 are transported through a chilling means 190. The chilling means 190 chills the temperature of the fused toppings disks 110 and sets the surface of the fused toppings disks prior to freezing. Preferably, a chilling means is used prior to freezing the fused toppings disks to prevent moisture transfer during the freezing process. In addition, chilling the fused toppings disks 110 prior to freezing aids in preventing surface deformation. Preferably, the fused toppings disks are subjected to an impingement of air containing carbon dioxide. More preferably, the fused toppings disks are exposed to an impingement of carbon dioxide for approximately 5 seconds to approximately 25 seconds as the fused toppings disks 110 are being transported. The amount of exposure time is dependant on the type of fused toppings disk and the rate of flow of the carbon dioxide. Preferably, an air-blast freezer or cryogenic freezer may be used as the chilling means 190. Optionally, alternative chilling means or prefreezing cool down options may be employed. A chilling means chamber may be used where the forming surfaces 135 and assembled components travel the length of a housing chamber in which ambient air is passed.

Upon exiting the chilling means 190, or if no chilling means has been employed, upon being rearranged by the lane diverter 178, the fused toppings disks 110 are frozen. Prior to packaging, the fused toppings disks 110 pass through a freezing means 195. The fused toppings disks are frozen to allow for prolonged storage periods and to prevent bacterial growth. Preferably, a fast freezer or a freezing means which freezes rapidly is used to avoid dehydration of the fused components. More preferably a standard spiral freezer is used. Preferably, the fused pizza toppings disks 110, are subjected to temperatures of approximately −40° F. to approximately −10° F. for approximately five minutes to approximately ten minutes. Preferably, a spiral freezer of the type manufactured by the Frigoscandia Company, of Sweden is used. Other freezing means 195 may be used which will vary the parameters of the time and temperature necessary to freeze a fused toppings disk made in accordance with the present invention.

Optionally, upon exiting the chilling means, or if no chilling means has been employed, upon being rearranged by the lane diverter, the fused toppings disks may be refrigerated. Preferably, prior to being refrigerated the fused toppings disks are packaged in a modified atmosphere package to prevent bacterial growth.

After the fused toppings disks are frozen, the forming surfaces 135 are separated from the toppings disk 110. Various separation methods may be used which do not affect the integrity of the toppings disk 110. Preferably, a vacuum belt means 198 is used which pulls the forming surface taught against the belt's surface causing the frozen toppings disk 110 to be peeled away automatically. Preferably, a standard vacuum belt such of the type known in the art is used. Once the forming surfaces are separated from the toppings disks, the toppings disks may be stored for subsequent use in assembling a pizza.

Figure 5:
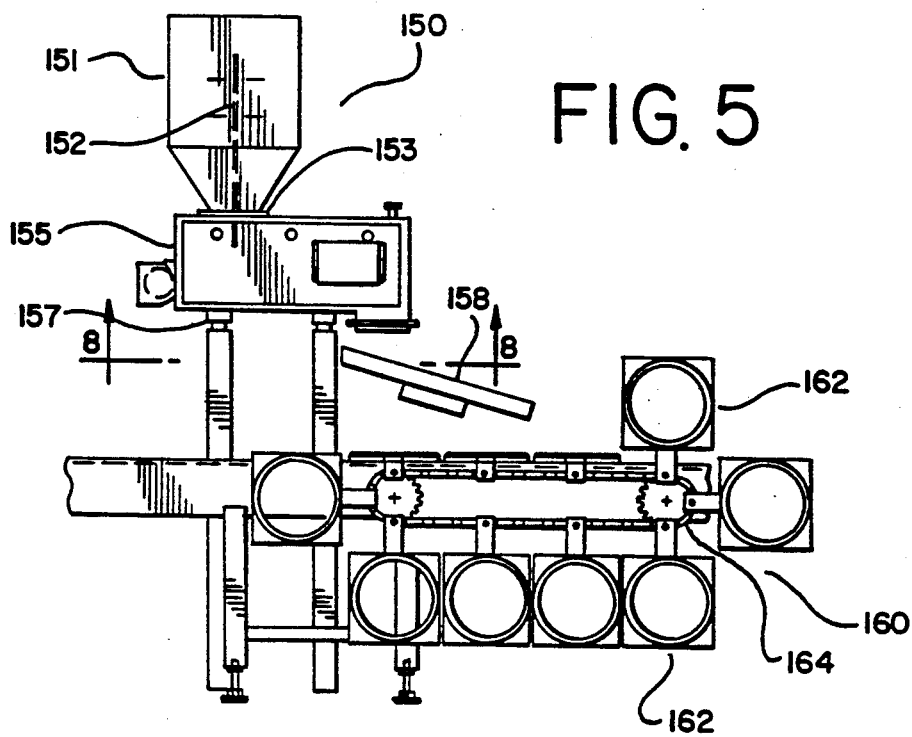
FIG. 5 is a cross-sectional view of the upper portion of the depositing means taken along Line 5—5 of FIG. 4.
Figure 4:
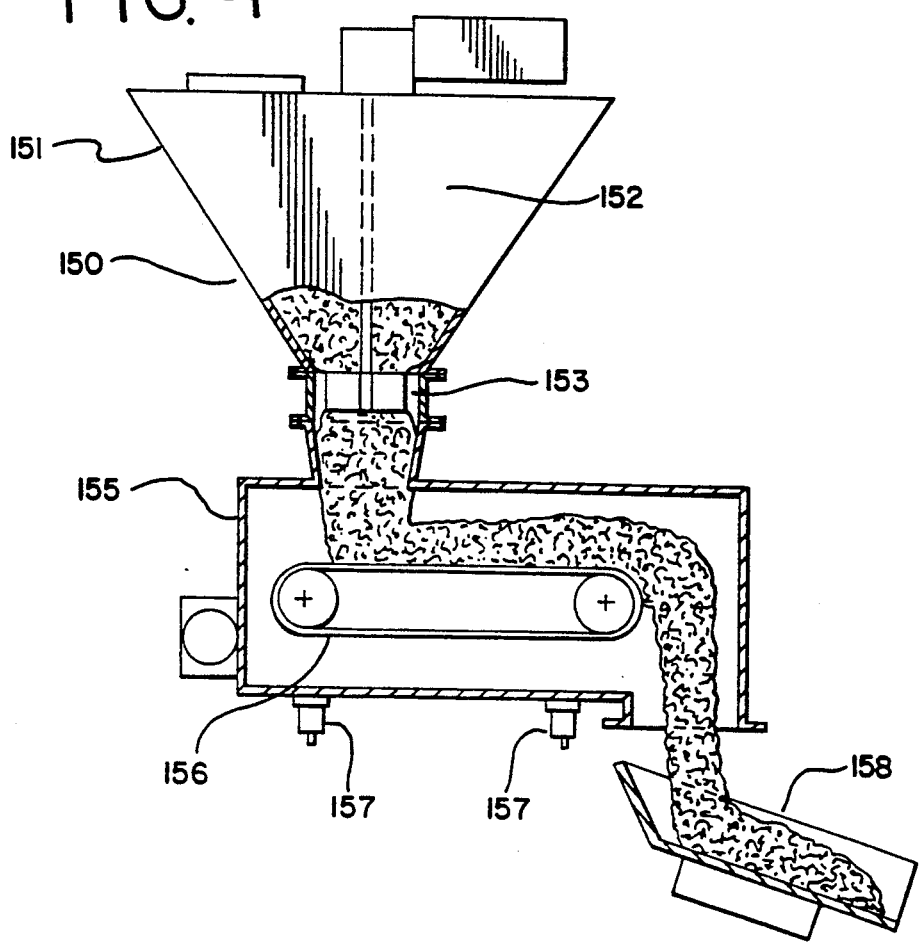
FIG. 4 is a perspective view of a depositing means of a preferred apparatus for making a pizza toppings disk.

Referring now to FIGS. 4 and 5 a weighbelt depositing means 150 and a template conveyor means 160 are shown. The weighbelt depositing means 150, as described previously, may be used for depositing various components of a pizza toppings disk onto the forming surfaces. A template conveyor means 160 is used to disperse the components into a predetermined shape as they are being deposited. Typically, when a weighbelt feed device is used as the depositing means 150, the component being deposited is feed into a hopper 151. Contained within the hopper is an agitator bar 152 which aids in depositing the component evenly. Additionally, the hopper 151 contains and orifice or window 153 which can be adjusted to change the flow rate of the component being deposited. The component is then feed into a weighbelt chamber 155. The weighbelt chamber is supported by a series of load cells 157. Preferably, the weighbelt depositing means is configured such that the load cells 157 communicate with the orifice 153 to ensure the proper amount of component is deposited. Within the weighbelt chamber is a weighbelt 156 which weighs the amount of component to be deposited. After the component is weighed it is passed through an opening and onto a vibratory plate 158. The vibratory plate 158 permits the component being deposited to be continuously deposited onto the forming surfaces without having to stop the conveyor belt 140 on an intermittent basis. Preferably, the weighbelt depositing means 150 is made of stainless steel construction and is approved by the United States Department of Agriculture.

As the component is dispensed from the vibratory plate 158 onto the forming surfaces 135, it is passed through a template conveyor means 160. The template conveyor means 160 disperses the component onto the forming surfaces 135 in a predetermined shape. The template conveyor means 160 is shaped and configured such that the entire amount of component being deposited is dispersed onto the forming surface in a specific shape without having to recycle excess amounts. The template conveyor means removes excess collected amounts of the component being deposited to a reclaim feed system that resupplies the waterfall or weighbelt depositing means 150. Preferably, the template conveyor means 160 is independent of the conveyor belt 140 and the depositing means 150 but is positioned to encompass the conveyor belt 140 in proximity of the depositing means. Preferably, the template conveyor is configured such that a loop having a series of templates 162 is formed which encompasses the automated traveling means or conveyor belt 140 upon which the forming surfaces 135 are transported.

Preferably, the loop having a series of templates is affixed such that the templates orientation is guided by a stationary cam track. Preferably, each template is affixed to the loop individually and have a hinged support bracket. The hinged support bracket permits the template to be adjusted to travel in parallel with the forming surfaces. Additionally, the template conveyor 160 includes a drive means 164 which allows each individual template 162 to travel over a forming surface 135 such that the template travels a predetermined distance above the forming surface 135. Optionally, the templates may be synchronized to be aligned with a forming surface 135 such that the template travels a predetermined distance above and is in synchronized correspondence with a forming surface 135.

Optionally, the template conveyor means 160 may be configured to have a single template which encompasses the automated traveling means or conveyor belt 140.

Optionally, under the present invention, pizza toppings disks may be prepared at a central location and then shipped to individual pizza restaurants, deliveries, and/or carryout businesses. Making the toppings disks of the present invention at a centralized location can reduce overhead expenses.

EXAMPLES

The following examples and tables, set forth below for purposes of illustration and description, further describe and illustrate a variety of pizza toppings disks made in accordance with the present invention. These examples and tables are not intended to be exhaustive or to limit the invention to the precise forms disclosed.

TABLE I illustrates by way of example the amounts of cheese and selected pizza toppings necessary for a variety of pizza toppings disks.

TABLE 1

| PIZZA TOPPINGS DISK TYPE | TOTAL QUANTITY OF CHEESES (ounces) | SELECTED TOPPINGS AND QUANTITIES (ounces) | |
|---|---|---|---|
| SUPREME | 7-8 oz. low moisture part-skim mozzarella | Sliced meats | 1-2 oz. |
| | | Ground meats | 2-4 oz. |
| | | Vegetables | 1-3 oz. |
| PEPPERONI | 3.5-4.5 oz. low moisture part-skim mozzarella | Sliced meats | 2-3 oz. |
| VEGETABLE | 3.5-4.5 oz. low moisture part-skim mozzarella | Vegetables | 4-9 oz. |

TABLE IA illustrates by way of example the amounts of cheese and selected pizza toppings necessary for a variety of pizza toppings disks made in accordance with the preferred apparatus disclosed herewithin.

TABLE IA

| AUTOMATED PIZZA TOPPINGS DISK | | | |
|---|---|---|---|
| AUTOMATED 6" PIZZA TOPPINGS DISK TYPE | TOTAL QUANTITY OF CHEESES (ounces) | SELECTED TOPPINGS AND QUANTITIES (ounces) | |
| SUPREME | 2-2.5 oz. low moisture part-skim mozzarella | Sliced meats | .25-1 oz. |
| | | Ground meats | .75-1 oz. |
| | | Vegetables | 1-2 oz. |
| PEPPERONI | 2-2.5 oz. low moisture part-skim mozzarella | Sliced meats | .50-1 oz. |
| CHEESE-LOW COUNT PEPPERONI | 1-2 oz. low moisture part-skim mozzarella | Sliced meats | .25-1 oz. |
| CHEESE | 3-3.5 oz. low moisture part-skim mozzarella | None | |
| MEAT LOVERS ® | 2-2.5 oz. low moisture part-skim mozzarella | Pepperoni | .25-1 oz. |
| | | Ground meats | 2.5-5 oz. |
| AUTOMATED 12" PIZZA TOPPINGS DISK TYPE | TOTAL QUANTITY OF CHEESES (ounces) | SELECTED TOPPINGS AND QUANTITIES (ounces) | |
| SUPREME | 3.5-4 oz. low moisture part-skim mozzarella | Sliced meats | 1-2 oz. |
| | | Ground Meat | 6-7 oz. |
| | | Vegetables | 3-4 oz. |
| PEPPERONI | 7-8 oz. low moisture part-skim mozzarella | Sliced meats | 2-3 oz. |
| CHEESE-LOW COUNT PEPPERONI | 3.5-4 oz. low moisture part-skim mozzarella | Sliced meats | 1-2 oz. |
| CHEESE | 10.5-11 oz. low moisture part-skim mozzarella | None | |
| MEAT LOVERS ® | 7-8 oz. low moisture part-skim mozzarella | Pepperoni | 1-2 oz. |
| | | Ground meats | 7-11 oz. |
| AUTOMATED 15" PIZZA TOPPINGS DISK TYPE | TOTAL QUANTITY OF CHEESES (ounces) | SELECTED TOPPINGS AND QUANTITIES (ounces) | |
| SUPREME | 10-11 oz. low moisture part-skim mozzarella | Sliced meats | 1.5-2 oz. |
| | | Ground Meat | 9-10 oz. |
| | | Vegetables 4.5-5 oz. | |
| PEPPERONI | 10.5-11 oz. low moisture part-skim mozzarella | Sliced meats | 3-4 oz. |
| CHEESE-LOW COUNT PEPPERONI | 5.25-6 oz. low moisture part-skim mozzarella | Sliced meats | 1.5-2.5 oz. |
| CHEESE | 15.75-16 oz. low moisture part-skim mozzarella | None | |
| MEAT LOVERS ® | 10-11 oz. low moisture | Pepperoni | 1.5-2 oz. |

TABLE IA-continued
AUTOMATED PIZZA TOPPINGS DISK

| | part-skim mozzarella | Ground meats | 10–13 oz. |

A SUPREME pizza is a pizza consisting of a plurality of pizza toppings. The typical pizza toppings placed on a SUPREME pizza include sliced meats such as pepperoni, ground meats such as sausage, and a variety of vegetables. In assembling a pizza toppings disk for a SUPREME pizza in accordance with the most preferred embodiment of the present invention, between 35% and 45% of the total quantity of cheese specified is evenly distributed on a forming surface having the desired diameter of the finished disk. This first quantity of cheese is formed into a first layer of cheese. Sliced meats are placed over this layer. Between 10% and 20% of the total quantity of cheese used is mixed with vegetables and ground meats and deposited onto the first layer of cheese. A second quantity of cheese consisting of between 35% and 45% of the total quantity of cheese used in a SUPREME pizza is then deposited onto the previous layer of cheese and layer of selected pizza toppings to form a second layer of cheese. The components are then fused to form a pizza toppings disk.

The other examples of various pizzas set forth in TABLE I and TABLE IA are made in the same manner as described above. However the total quantities of cheese used and the pizza toppings selected and quantities thereof vary according to the amounts disclosed in TABLE I and TABLE IA. TABLE II sets forth the corresponding preferred partial, minimal melt conditions of the preferred methods of fusing for the various toppings disks disclosed in TABLE I.

TABLE II

| PIZZA TOPPINGS DISK TYPE | TEMPERATURE FOR PARTIAL MELT (F.) | TIME FOR PARTIAL MELT (minutes) |
|---|---|---|
| SUPREME | 425° F. | 3.20 min. |
| PEPPERONI | 425° F. | 2.50 min. |
| VEGETABLE | 425° F. | 2.50 min. |

TABLE IIA sets forth the corresponding preferred partial, minimal melt conditions of a preferred fusing means with an impingement of steam for the various toppings disks disclosed in TABLE IA.

TABLE IIA

| PIZZA TOPPINGS DISK TYPE | TEMPERATURE FOR PARTIAL MELT (F.) | TIME FOR PARTIAL MELT (seconds) |
|---|---|---|
| SUPREME | 280° F. | 25 sec. |
| PEPPERONI | 280° F. | 25 sec. |
| CHEESE-LOW COUNT PEPPERONI | 280° F. | 20 sec. |
| CHEESE | 280° F. | 20 sec. |
| MEAT LOVERS ® | 280° F. | 25 sec. |

The toppings disks described above were used to assemble uncooked pizzas as follows: the pizza toppings disks were placed on top of uncooked pizza shells, and pizza sauce was applied between the toppings disks and the pizza shells. The pizza toppings disks and uncooked pizza shells were then baked to produce cooked pizzas. The appearance and texture of the cooked pizzas were the same as that of pizzas prepared by traditional methods.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and various embodiments and with various modifications as are suited to the particular use contemplated. It is intended that the scope of the invention be defined by the following claims, including all equivalents.

We claim:

1. An apparatus for making a pizza toppings disk comprising:
   automated means for transporting a non-edible forming surface;
   cheese depositing means for depositing a layer of cheese onto said forming surface;
   pizza toppings depositing means for depositing a plurality of pizza toppings onto said forming surface, said pizza toppings selected from the group consisting of sliced meats, ground meats, and vegetables as well as combinations thereof; and
   fusing means for fusing together said layer of cheese and said pizza toppings to thereby form a pizza toppings disk without baking said cheese and pizza toppings.

2. The apparatus of claim 1 further comprising a freezing means for freezing said toppings disk such that said disk may be stored for subsequent use.

3. The apparatus of claim 2 further comprising a chilling means for chilling and setting the surface of the pizza toppings disk prior to freezing said disk.

4. The apparatus of claim 1 wherein the means for fusing comprises means for applying heat to the cheese and pizza toppings to thereby cause a partial minimal melting of the cheese.

5. The apparatus of claim 1 wherein the means for fusing comprises means for contacting said cheese and pizza toppings with heated air and steam.

6. The apparatus of claim 5 wherein the means for contacting comprises means for subjecting the cheese and pizza toppings to a temperature between about 200° and about 350° F.

7. The apparatus of claim 1 wherein the means for fusing comprises means for subjecting the cheese and pizza toppings to a temperature between about 200° and about 350° F.

8. The apparatus of clam 1 wherein he non-edible forming surface is a sheet of disposable material and wherein the apparatus further comprises means for feeding individual sheets of said disposable material to the means for transporting the non-edible forming surfaces.

9. The apparatus of claim 8 wherein the disposable material is paper.

10. The apparatus of claim 1 wherein the non-edible forming surface is a pan.

11. An apparatus for making a pizza toppings disk comprising:

conveyor means for transporting a non-edible forming surface;

cheese depositing means for depositing a quantity of cheese onto said forming surface, said cheese depositing means forming said quantity of cheese into a layer of cheese, said layer of cheese being appropriately shaped to be subsequently placed on top of a pizza shell;

pizza toppings depositing means for depositing onto said forming surface a plurality of pizza toppings, said pizza toppings selected from the groups consisting of sliced meats, ground meats, and vegetables as well as combination thereof;

second cheese depositing means for depositing a second quantity of cheese on top of said layer of cheese and said pizza toppings; and fusing means for fusing said quantities of cheese and said pizza toppings together to thereby form a pizza toppings disk without baking said quantities of cheese or said pizza toppings.

12. An apparatus for making a pizza toppings disk comprising:

conveyor means for transporting a non-edible forming surface;

a plurality of depositing means for depositing a plurality of pizza toppings disk components onto said forming surface, said pizza toppings disk components including cheese and a plurality of pizza toppings selected from the groups consisting of sliced meats, ground meats, and vegetables as well as combinations thereof; wherein said components are deposited onto said forming surface in a predetermined shape; and fusing means for fusing said pizza toppings disk components together to thereby form a toppings disk without baking said components.

13. The apparatus of claim 12 further comprising a chilling means for chilling and thereby setting the surface of the pizza toppings disk.

14. The apparatus of claim 12 further comprising a freezing means for freezing said toppings disk such that said disk may be stored for subsequent use.

15. An apparatus for making a pizza toppings disk comprising:

means for providing individual sheets of a non-edible disposable material;

automated means for transporting said sheets;

cheese depositing means for depositing a layer of cheese onto each of said sheets;

pizza toppings depositing means for depositing a plurality of pizza toppings onto each of said sheets, said pizza toppings selected from the group consisting of sliced meats, ground meats, and vegetables as well as combinations thereof;

heating means for heating said layer of cheese and pizza toppings to thereby fuse said layer of cheese and said pizza toppings together to thereby form a pizza toppings disk on top of each of said sheets without baking said cheese and pizza toppings; and freezing means for freezing said pizza toppings disks.

16. The apparatus of claim 15 wherein the heating means comprise means for contacting the cheese and pizza toppings with heated air and steam.

17. The apparatus of claim 15 wherein the disposable material is paper.

* * * * *